United States Patent [19]

Fry

[11] Patent Number: 4,704,921

[45] Date of Patent: Nov. 10, 1987

[54] DIFFERENTIAL GEAR DRIVE HAVING TWO OUTPUT SHAFTS BETWEEN WHICH THERE IS A LIMITED SPEED RATIO

[75] Inventor: Timothy S. Fry, Rugby, United Kingdom

[73] Assignee: Bartel Engineering Limited, Harleston, United Kingdom

[21] Appl. No.: 849,783

[22] Filed: Apr. 9, 1986

[30] Foreign Application Priority Data

Apr. 9, 1985 [GB] United Kingdom ............... 8509056

[51] Int. Cl.[4] .......................... F16H 1/42; F16H 1/44
[52] U.S. Cl. ...................................... 74/714; 74/711; 192/93 A
[58] Field of Search ............... 74/711, 714; 192/93 A

[56] References Cited

U.S. PATENT DOCUMENTS

| | | | |
|---|---|---|---|
| 1,336,643 | 4/1920 | Lowry | 74/714 |
| 3,572,165 | 3/1971 | Roper | 192/93 A X |
| 4,022,308 | 5/1977 | Hurst | 192/93 A X |
| 4,189,038 | 2/1980 | Hurst | 192/93 A X |
| 4,535,651 | 8/1985 | Chambers | 74/714 X |

FOREIGN PATENT DOCUMENTS

| | | | |
|---|---|---|---|
| 1954534 | 6/1970 | Fed. Rep. of Germany | 74/711 |
| 883892 | 7/1943 | France | 74/711 |
| 0171143 | 10/1982 | Japan | 74/711 |
| 262489 | 6/1949 | Switzerland | 74/711 |

Primary Examiner—Leslie Braun
Assistant Examiner—Dirk Wright
Attorney, Agent, or Firm—Gifford, Groh, VanOphem, Sheridan, Sprinkle and Dolgorukov

[57] ABSTRACT

A differential gear drive having two output shafts each coupled through a differential gear train to a common input gear. The differential gear train comprises an annulus gear engaging the input gear, planet gears and a sun wheel. The output shaft is connected to a planet carrier and the output shaft is connected to the sun wheel. A pair of cam rings are rotatably coupled to the respective output shafts and are respectively coupled via clutch teeth to clutch rings respectively, which are engageable separately with a pair of meshing reference gears. The reference gear is rotatably fixed by a countershaft to the input gear. When both output shafts are driving against substantially equal torques the clutch rings are both disengaged from the reference gear and so the drive to each shaft is via the differential gear train. However when one of the output shafts commences to loose resistance torque, the respective clutch ring engages the reference gear and so a reaction via the reference gears is provided for the other output shaft, thereby maintaining traction in the case of a motor vehicle.

8 Claims, 4 Drawing Figures

DIFFERENTIAL GEAR DRIVE HAVING TWO OUTPUT SHAFTS BETWEEN WHICH THERE IS A LIMITED SPEED RATIO

BACKGROUND OF THE INVENTION

The invention relates to a differential gear drive.

In, for example, a motor vehicle supported by one or more axles carrying ground-engaging wheels, the wheels at each end of those axles rotate at the same speed when the vehicle is travelling in a straight path. However, when the vehicle is travelling in a curve, the wheel at the outside of the curve of a pair of wheels on an axle has to travel further than the other wheel in the same time. This means that on an axle where the wheels are connected together without permitting relative rotation therebetween, the traction between the wheels and the ground must be broken for either or both of the wheels on that axle. The force necessary to do this can usually only be provided by increasing the forces generated between the steered wheels and the ground. In view of the connection between the two wheels which is necessary for transmission of driving torque this increase in forces will interfere with the steering of the vehicle. To permit maneuvering without inhibiting steering action it is usual to fit a differential gear drive into the driving axle.

This is satisfactory when the wheels at each end of the driving axle and driven through the differential gear drive have sufficient grip on the ground surface. However the differential gear drive is a gear train which transmits equal torque to both output shafts provided equal reaction is generated in each of those shafts to provide the other with a reaction member. Thus if one of the wheels is on relatively slippery ground where no significant reaction is available at that wheel, the application of power to the differential gear drive causes the shaft driving the wheel on slippery ground to rotate ineffectively, denying drive to the other driven wheel which may still have reasonable grip on the ground on which it rests. Thus the vehicle is unable to move.

One way in which this problem has been overcome is to lock the differential gear drive when a driven wheel commences to slip or spin, or when the ground conditions are such that wheel slip or spin would otherwise occur, and thereby to prevent the differential gear drive acting at all and instead causing the driven wheels to be driven together at the same speed. This causes the driven wheels to be connected together thereby preventing relative rotation therebetween and produces the undesirable steering effects set out hereinbefore. As a result, where the steering wheel has been turned before the differential gear drive is locked, the locked driven wheels would act in conflict with the sterring effect, thereby causing unpredictable steering behavior. Such locking of the differential is thus most undesirable.

Another attempt to overcome the problem has been to use viscously-constrained differential gears in which the resistance of the differential gear drive to further increasing the relative rates of rotation of the output shafts increases substantially in proportion to an increase in those relative rates of rotation. Thus the undesirable effects on the vehicle steering of such a device are less than those of the simple differential locking devices discussed hereinbefore they are of the same degree and direction and towards the limit, the differential gear drive would again be undesirably locked. Other prior proposals have included the use of automatic devices to divert torque to the wheel which retains grip by the use of clutch or free-wheel arrangements which are actuated as the gripping wheel slows down, as it must do with the loss of drive when the non-gripping wheel slips. However the non-gripping wheel accelerates much faster than the gripping wheel decelerates and so the engine must accelerate with it, so that inertia effects lead to substantial load and sudden off-center drive effects which inhibit vehicle control and necessitate a differential gear drive of great bulk and cost to deal with these undesirable effects.

The maximum speed ratio between the output shafts of a differential gear drive fitted to a vehicle is a fixed value for that vehicle and depends only upon the dimensions of the track, wheel-base and maximum available steering angle of the vehicle. Other prior proposals have sought to constrain the differential gear drive to operate only within this regime but these proposals have involved means which are unacceptably fragile and in passenger car applications unacceptably noisy. As a result no automatic devices which achieve this desirable regime are in use in motor vehicles. The only devices which are in use are of the fundamentally undesirable locking type already discussed.

It is an object of the invention to provide a differential gear drive in which the relative speed ratio between the output shafts is limited to that necessary for the vehicle concerned by automatically sensing the overspeeding of a wheel having inadequate grip and preventing a relative speed ratio greater than the ratio specified. It is a further object of this invention to provide such a differential gear drive in which the drive to the other driven wheel or wheels is continued as normal through the differential gears as a result of means associated with the overspeeding shaft maintaining an adequate reaction on that shaft and thus a maximum speed ratio between the spinning and gripping wheels so as to eliminate undesired effects on the steering while continuing smoothly and continuously to transmit drive to the gripping wheel.

According to the invention, a differential gear drive between two output shafts each coupled through respective differential gears of the gear drive to a common input member includes control means whereby the maximum speed ratio between the two output shafts is limited to that ratio which is necessary for the differential gear drive to perform its intended function, whereby overspeeding of an output shaft which is under-loaded is prevented and torque is transmitted to a loaded output shaft at all times by means of respective differential gears, the differential action being unconstrained until said maximum speed ratio between the output shafts has been reached.

The control means may comprise a separate control clutch for each output shaft acting between that output shaft and a speed reference member co-axial with said output shaft.

The speed reference member is preferably common to both output shafts.

Said clutch means is not capable of transmitting drive direct to the output member so as to by-pass the differential gear and said clutch disengages immediately upon the speed of the overspeeding output member tending to fall below said limiting maximum speed. These means enable the transmission of drive to the gripping output member throughout. The limiting speed selected must be substantially equal to or proportional to $\sqrt{R}$ or $1/\sqrt{R}$, where R is the maximum differential ratio required of the differential gear drive in a particular vehicle.

BRIEF DESCRIPTION OF THE DRAWINGS

By way of example, two preferred embodiments of differential gear drive in accordance with the invention are described in the following drawings, in which.

DETAILED DESCRIPTION OF THE PREFERRED EMBODIMENTS

Figure 1:
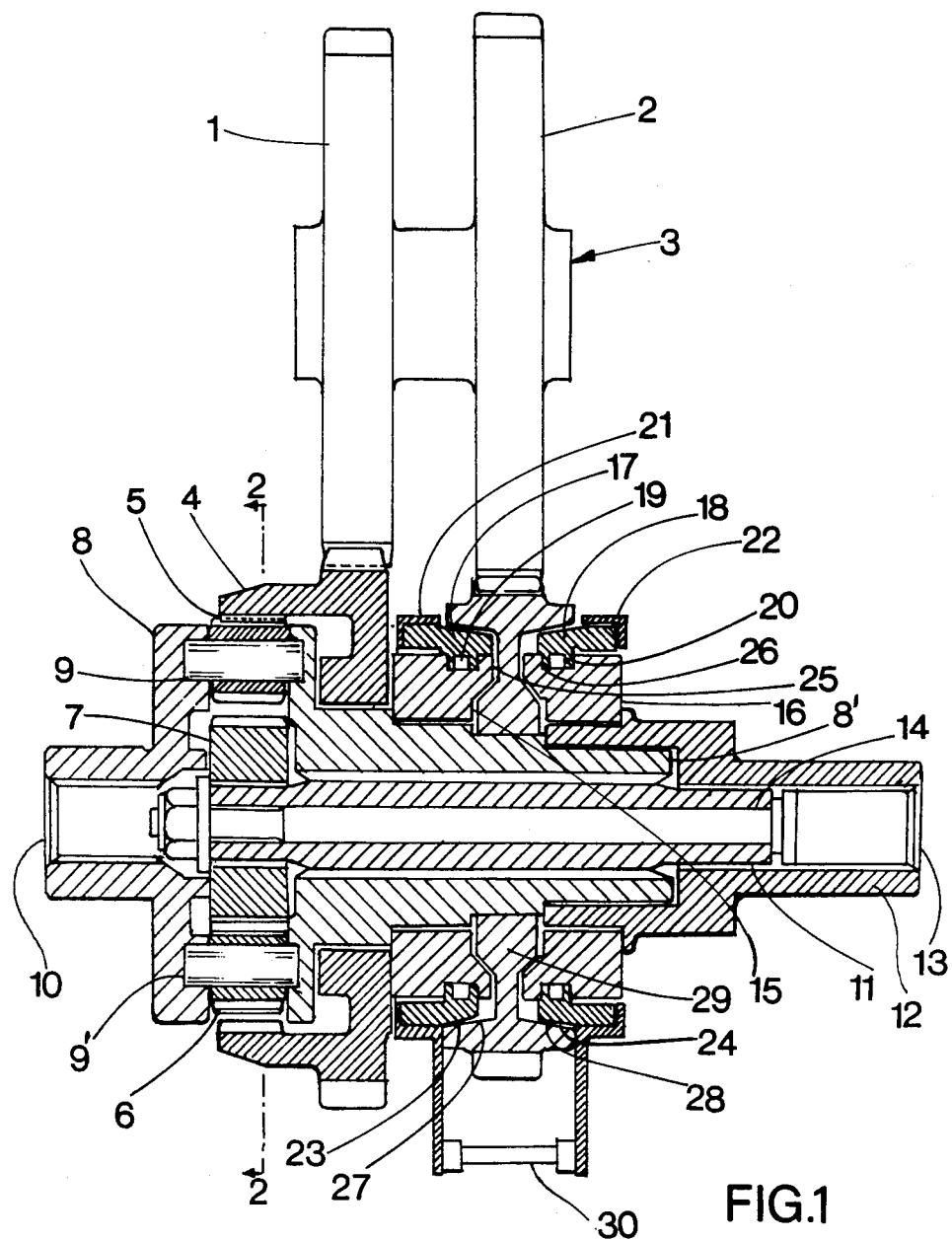
FIG. 1 is an axial section through the differential gear drive mechanism of a vehicle, the casing and bearing members which do not contribute to the action of the differential gear drive being omitted for clarity.
Figure 2:
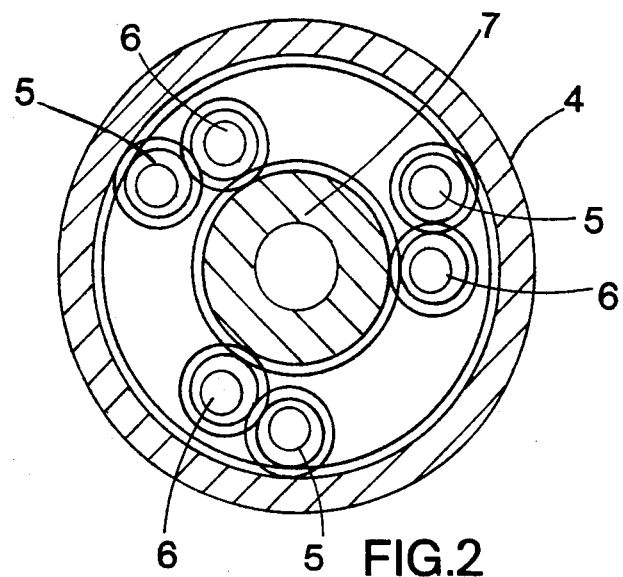
FIG. 2 is a section on line 2—2 in FIG. 1.

In FIG. 1, the differential gear drive includes a main input gear 1, which is co-axial with a reference drive gear 2, both being mounted on countershaft 3 so as not to permit relative rotation between either gear 1, 2 and the shaft 3. Input gear 1 meshes with annulus gear 4 which in turn meshes with outer planet gears 5 which themselves mesh with inner planet gears 6 transmitting drive to sun wheel 7 as shown in FIG. 2. The planet gears 5,6 are carried on pins 9, 9' within the planet carrier 8, 8'. The use of grouped double planet gears has the effect of ensuring that the sun gear 7 and the planet carriers 8, 8' rotate in the same sense. Output is taken from the planet carrier 8 to a first output shaft splined into the coupling 10 and from the sun wheel 7 via quill shaft 11 to coupling 12 and to a second output shaft splined into coupling 12 at 13. Coupling 12, quill shaft 11 and sun wheel 7 are held together by through bolt 14 with the drive being transmitted by way of splines as shown. First cam ring 15 is non-rotatably fixed onto planet carrier 8' and second cam ring 16 is similarly non-rotatably fixed onto coupling 12 and hence to sun wheel 7 as described hereinbefore. Thus first cam ring 15 and second cam ring 16 are rotatably coupled to the output shafts attached at 10 and 12 respectively and hence are driven by both shafts. Circumferentially surrounding first and second cam rings 15 and 16 are first and second clutch rings 17 and 18 respectively. These have hexagonal teeth 19 and 20 protruding from the inner surface of the rings 17 and 18 and possess first and second conical clutch faces 23 and 24 respectively. First and second clutch rings 17 and 18 are supported in first and second plain bearings 21 and 22 respectively which are non-rotatably fixed to the casing (not shown) at 30.

Figure 3:
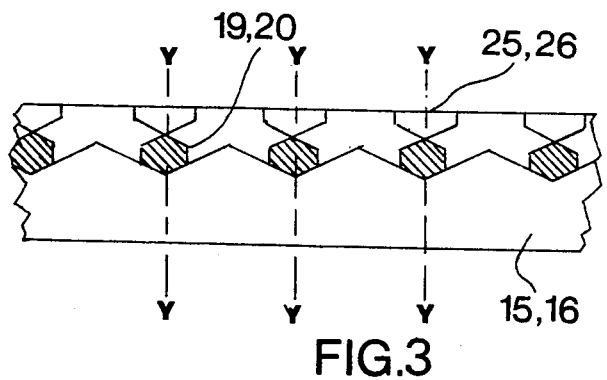
FIG. 3 represents a development onto a plain surface of part of a cam track of a cam ring 15 or 16 shown in FIG. 1.

The arrangement of the hexagonal teeth 19 and 20 on the cam tracks on first and second cam rings 15 and 16 may be better understood by reference to FIG. 3 in which the disposition of disengagement cams 25 and 26 respectively are also shown. These disengagement cams 25 and 26 are integral parts of first and second cam rings 15 and 16 respectively. First and second frusto-conical clutch faces 23 and 24 mate with corresponding first and second frusto-conical clutch faces 27 and 28 respectively, these being part of a reference gear member 29 which meshes with and is driven by reference drive gear 2.

The mode of action of the differential gear drive is as follows. The relative diameters of main input gear 1 and reference drive gear 2 are such that the reference gear member 29 is driven at a speed which is constantly faster than the speed of the annulus 4 in a ratio which is substantially equal to $\sqrt{R}$, where R is the maximum differential ratio required in the differential gear drive. As both the main input gear 1 and the reference gear drive 2 are non-rotatably connected to the common shaft 3 all of parts 1, 2, 3, 4 or 29 must rotate together. As long as both output shafts are driving against substantially equal torques, which in the case of a motor vehicle would be so long as both wheels driven by the common differential retain a grip on the ground, drive proceeds via the differential gears in an unconstrained manner and the reference gear member 29 and the associated cam and clutch assemblies take no part in the drive. Referring to FIG. 3, at start up the cam ring 15 or 16 driven by one of the output couplings 10 or 12 respectively begins to rotate as soon as the output shafts rotate. Teeth 19 or 20 on clutch rings 17 or 18 respectively are subjected to a slight force in the direction opposite to that of rotation, that force arising from the fixed bearing rings 21 or 22 respectively. The teeth 19 or 20 in attempting to move circumferentially of the cam ring 15 or 16 respectively are obliged by virtue of the cam profile to move axially of the cam at the same time in the direction of lines YY. This moves clutch faces 23 or 24 towards engagement with clutch faces 27 or 28 respectively on reference gear member 29. These are rotating faster than cam ring clutch faces 23 or 24 by virtue of the gear ratio difference between reference gears 2 and 29 and input gears 1 and 4 respectively. The hydrodynamic oil film drag between faces 23 or 24 and 27 or 28 respectively exerts a force in opposition to the hydrodynamic oil film force from the fixed bearing rings 21 or 22 respectively which were urging clutch faces 23 or 24 towards clutch faces 27 or 28 respectively. Thus when these two hydrodynamic forces balance as clutch face 23 approaches 27 or clutch face 24 approaches clutch face 28, motion of teeth 19 or 20 relative to first or second cam rings 15 or 16 respectively and hence of clutch faces 23 or 24 towards mating clutch faces 27 or 28 respectively will cease with the clutches still disengaged. As long as operation of the differential gear drive continues within the speed ratio envelope determined by the predetermined speed ratio between reference member 29 and annulus 4, that is so long as both outputs are loaded to substantially the same torque then, the mechanism will continue without engagement of clutches 23 or 24 and 27 or 28 respectively. Teeth 19 or 20 will adopt stable positions along the cam track on first and second cam rings 15 or 16 respectively, depending on the ratio between the speed of individual first and second output couplings 10 or 13 respectively and that of the reference gear member 29. However as soon as an output, say 10, approaches the limit of the predetermined speed ratio envelope then that speed change is transmitted by planet carrier 8, 8' and first cam ring 15 to the teeth 19 on first clutch ring 17 so that the hydrodynamic force between mating clutch faces 23 and 27 decreases while the hydrodynamic force between first bearing ring 21 and first clutch ring 17 continues to increase. When the limit is reached, i.e., when the ratio between output 10 and 13 is substantially the value R then the hydrodynamic force between clutch faces 23 and 27 disappears altogether as those faces become synchronised. If the speed ratio between first and second outputs 10 and 13 respectively tends to exceed the value R then the hydrodynamic force between clutch faces 23 and 27 reverses and augments that between first fixed bearing 21 and first clutch ring 17 so that mating clutch faces 23 and 27 are axially urged into engagement with no relative rotational velocity. When this occurs output coupling 10 is connected by what amounts to a one-way drive to reference gear member 29 and hence to the main input. It thus provides a reaction member for output 13 which retains load. The angles of clutch faces 23, 24, 27 and 28 are so chosen that as soon as the axial joining load is removed then the clutch faces disengage. As soon as load is restored to output coupling 10 then that output will slow hence the closing force arising from the action of the hydrodynamic force between first clutch ring 17 and first fixed bearing 21 will diminish, permitting disengagement cams 25 on first cam ring 15 to push the mating clutch faces 23 and 27 out of engagement thus restoring operation of the differential to normality. Drive cannot be transmitted to output coupling 10 from input gear 1 via shaft 3 and reference gear 2 and the clutch and cam mechanism since the disengagement mechanism as described would immediately come into action to disengage clutches 23 and 27 and prevent this. Drive continues to be transmitted to output 12 throughout and an increase in torque at that output acts via the differential gear train 7, 6, 5, 4 to increase the torque in the differential planet carrier 8, 8' which via first cam ring 15, teeth 19, and first clutch ring 17 transmits force to mating clutch face 23 and 27 which continue to provide a reaction.

Exactly the same set of circumstances apply should the shaft connected at output coupling attempt to overspeed, the effect being transmitted by coupling 12 to second cam ring 16, teeth 20, second clutch ring 18 supported in second fixed bearing 22 to mating clutch faces 24 and 28, disengagement being effected by cams 26.

Since parts 1, 3 and 2 are non-rotatably connected and since by action of gears 4, 5, 6 and 7 any speed increase in output 10 relative to the input speed must be matched by a speed decrease in output 13 and vice versa, overspeeding of outputs 10 and 13 cannot take place simultaneously.

It will further be apparent that the symmetry of each individual cam and tooth about lines YY in FIG. 3 means that the device is bi-directional and hence reversible.

Figure 4:
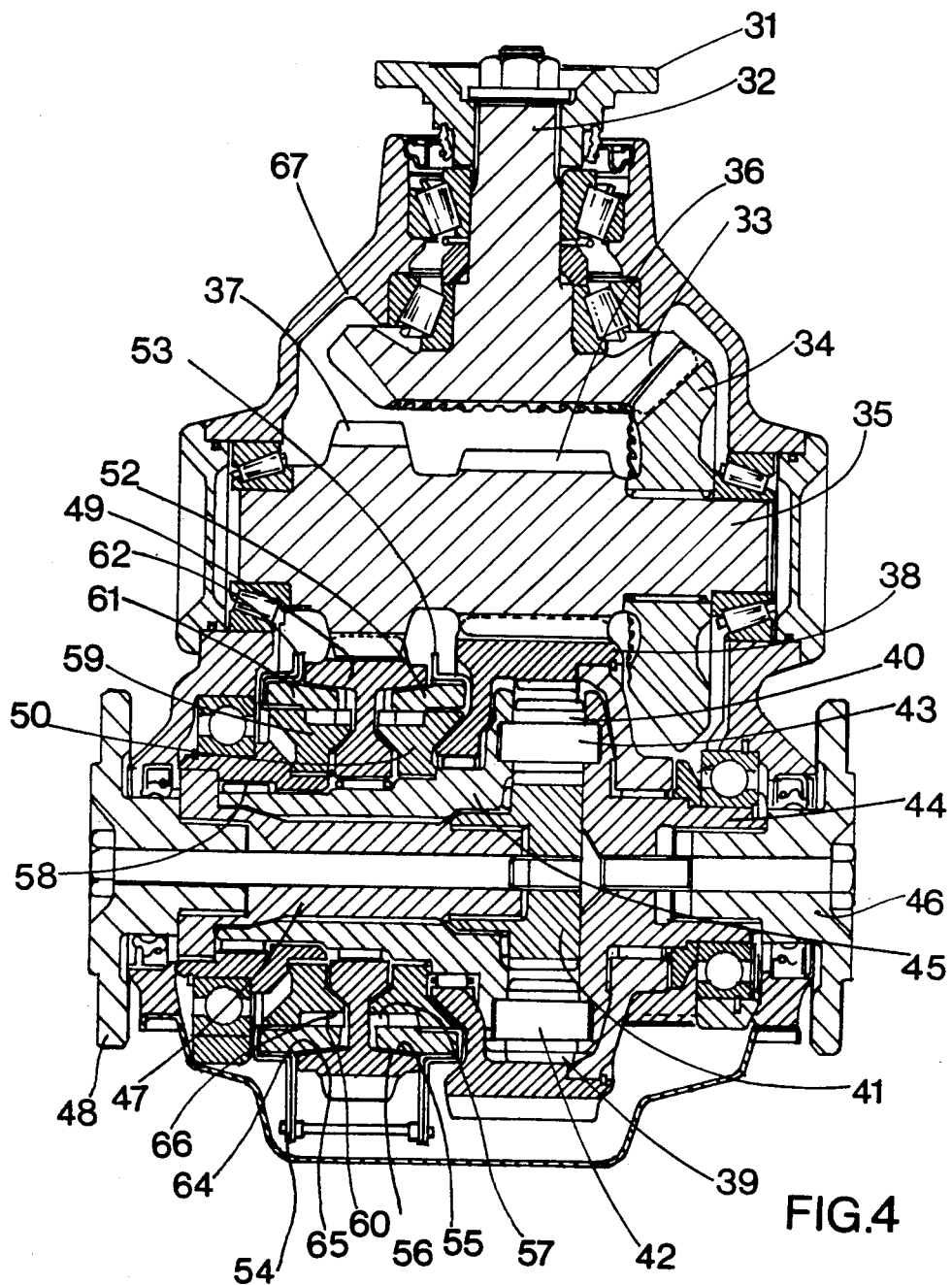
FIG. 4 depicts a version of the mechanism suitable for a motor vehicle and includes possible input drive arrangements, and shows the disposition of the bearings and the casing.

Referring now to FIG. 4, the drive from the vehicle change speed gear box is transmitted to coupling 31 hence via shaft 32 to first bevel gear 33 meshing with second bevel gear 34 which is non-rotatably attached to countershaft 35 and hence transmits drive to main input gear wheel 36 and reference drive gear 37. The drive to the output half shafts is via annulus 38 meshing with main input gear wheel 36 and outer planet wheels 39 hence, as in the example shown in FIG. 1, to inner planet wheels 40 and sun wheel 41. The outer and inner planet wheels 39, 40 are supported on spindles 42 and 43 respectively which are in turn borne by planet carrier portion 44 and 45. Output drive is thus taken from planet carrier portion 44 to the first output drive coupling 46 and from sun wheel 41 via quill shaft 47 to the second output drive coupling 48.

The mechanism for limiting the maximum speed ratio between first output drive 46 and second output drive 48 is also substantially as in the example shown in FIG. 1. Reference drive gear 37 meshes with reference gear member 49. Planet carrier portion 45 drives first cam ring 50 into the cam track in which are located teeth 51 of first clutch ring 52, which is borne by first fixed bearing ring 53 secured to the casing at 54. Clutch face 55 on first clutch ring 52 co-operates with first clutch face 56 on reference gear member 49. First cam ring 50 also has disengagement cams 57. Drive from the second output drive 48 to the corresponding ratio limiting mechanism for that output travels via sleeve 58 to second cam ring 59 with disengagment cams 66, teeth 60 of second clutch ring 61 engage with the cam on second cam ring 59. Second clutch ring 61 is supported in second fixed bearing 62 and has clutch face 64 cooperating with second reference clutch face 65 on the reference gear member 49. The whole mechanism is enclosed in casing 67.

Operation is also as in the example shown in FIG. 1 from which it will be readily understood that overspeeding of first output 46 by the mechanism described hereinbefore causes clutch faces 55 and 56 to engage so preventing any further increase in speed and providing a reaction member to permit continuation of drive to second output 48. Similarly overspeeding of second output drive 48 causes engagement of clutch faces 64 and 65 and likewise provides a reaction member for first output drive 46. As in the version shown in FIG. 1 the device is bi-directional.

It will be appreciated that any form of robust and automatically self-reversible free-wheel device would be effective in place of the preferred cam ring and clutch ring arrangements described herein, provided that that alternative device does not constrain operation of the differential within the permitted speed ratio envelope and provided that it is sufficiently robust to be able to react to full driving torque on one output. Operation must be as in the case with the preferred mechanism smooth and in the case of use in a passenger vehicle it must also be silent. One major advantage of the mechanism proposed is that since clutch engagement occurs only when the clutch faces are synchronised, the device will be almost wear-free. The only wearing parts are the clutch rings and the static bearings that support them and these are subject only to very minor loads.

I claim:

1. A limited ratio differential gear drive comprising a differential gear assembly comprising an input annular gear; a sun gear; a plurality of planet gears intermeshed between said annular gear and said sun gear; a rotatable planet carrier; a first rotatable output member driven by said sun gear; a second rotatable output member driven by said planet carrier, said annular gear, said sun gear, said planet carrier and said first and said second output members all being co-axial and having a common first axis of rotation; said gear drive also comprising a driven reference gear rotatable independently about said first axis; a countershaft rotatable about a second axis parallel to said first axis; an input driving gear and an input reference gear both mounted for rotation as a unit with said countershaft, said input driving gear drivingly engaging said annular gear of said differential gear assembly and said input reference gear drivingly engaging said driven reference gear, the respective gear ratios between said input driving gear and said annular gear and between said input reference gear and said driven reference gear being in a predetermined ratio one to the other, whereby said annular gear is driven slower than said driven reference gear in said predetermined ratio;

first and second annular clutch faces on said driven reference gear; first and second cam rings non-rotatably and co-axially mounted on said first and second output members respectively, each cam ring having a plurality of cam surfaces thereon; first and second clutch rings rotatable and co-axially mounted with respect to each of said cam rings, each said clutch ring having a plurality of teeth and an annular clutch face thereon, said teeth being engaged with said cam surfaces on the respective cam ring and said clutch face on each clutch ring being engageable with a respective one of said clutch faces on said driven reference gear, and first and second fixed bearing means in which the respective first and second clutch rings are mounted, whereby on rotation of the respective first and second output members below the speed at which said driven reference gear is rotating, said clutch face on the respective clutch ring is spaced from the respective clutch face on said driven reference gear and thereby the respective speeds of said first and second output members are determined solely by said differential gear assembly and when one of said first and second output members attains the speed of rotation of said driven reference gear, said one output member is constrained from exceeding that speed by the clutch face of the respective clutch ring engaging the respective clutch face of said driven reference gear as a result of said clutch ring being driven by said cam surfaces of the respective cam ring in opposition to drag exerted by the respective fixed bearing means.

2. A limited ratio differential gear drive as claimed in claim 1 in which said clutch faces on each said clutch ring and said clutch faces on said driven reference gear are frusto-conical.

3. A limited ratio differential gear drive as claimed in claim 1 in which the movement of said one clutch ring towards a clutching position in which the clutch face thereof engages the corresponding clutch face of said driven reference gear is controlled by a balance of hydrodynamic forces acting between said clutch faces and between said clutch ring and said fixed bearing means in which it is mounted.

4. A limited ratio differential gear driven as claimed in claim 3 in which said balance of hydrodynamic forces precludes engagement of corresponding clutch faces on a clutch ring and said driven reference gear until the rotational speed of said clutch ring has become synchronised with that of said driven reference gear.

5. A limited ratio differential gear drive as claimed in claim 4 in which additional cam surfaces are provided on each said cam ring to effect positive disengagement of said engaged clutch faces when the speed of the respective output member has fallen below the speed of said driven reference gear.

6. A limited ratio differential gear drive comprising a differential gear assembly comprising an input annular gear; a sun gear; a plurality of planet gears intermeshed between said annular gear and said sun gear; a rotatable planet carrier; a first rotatable output member driven by said sun gear; a second rotatable output member driven by said planet carrier, said annular gear, said sun gear, said planet carrier and said first and said second output members and all being co-axial and having a common first axis of rotation; said gear drive also comprising a driven reference gear rotatable independently about said first axis; a countershaft rotatable about a second axis parallel to said first axis; an input driving gear and an input reference gear both mounted for rotation as a unit with said countershaft, said input driving gear drivingly engaging said annular gear of said differential gear assembly and said input reference gear drivingly engaging said driven reference gear, the respective gear ratios between said input driving gear and said annular gear and between said input reference gear and said driven reference gear being in a predetermined ratio one to the other, whereby said annular gear is driven slower than said driven reference gear in said predetermined ratio; first and second frusto-conical clutch faces on said driven reference gear; first and second cam rings non-rotatably and co-axially mounted on said first and second output members respectively, each cam ring having a plurality of cam surfaces thereon; first and second clutch rings rotatable and co-axially mounted with respect to each of said cam rings, each said clutch ring having a plurality of teeth and a frusto-conical clutch face thereon, said teeth being engaged with said cam surfaces on the respective cam ring and said clutch face on each clutch ring being engageable with a respective one of said clutch faces on said driven reference gear, and first and second fixed bearing means in which the respective first and second clutch rings are mounted, whereby on rotation of the respective first and second output members below the speed at which said driven reference gear is rotating, said clutch face on the respective clutch ring is spaced from the respective clutch face on said driven reference gear and thereby the respective speeds of said first and second output members are determined solely by said differential gear assembly and when one of said first and second output members attains the speed of rotation of said driven reference gear, said one output member is constrained from exceeding that speed by the clutch face of the respective clutch ring engaging the respective clutch face of said driven reference gear as a result of said clutch ring being driven by said cam surfaces of the respective cam ring in opposition to drag exerted by the respective fixed bearing means, the movement of said one clutch ring towards a clutching position in which the clutch face thereof engages the corresponding clutch face of said driven reference gear being controlled by a balance of hydrodynamic forces acting between said clutch faces and between said clutch ring and said fixed bearing means in which it is mounted.

7. A limited ratio differential gear drive as claimed in claim 6 in which said balance of hydrodynamic forces precludes engagement of corresponding clutch faces on a clutch ring and said driven reference gear until the rotational speed of said clutch ring has become synchronised with that of said driven reference gear.

8. A limited ratio differential gear drive as claimed in claim 7 in which additional cam surfaces are provided on each said cam ring to effect positive disengagement of said engaged clutch faces when the speed of the respective output member has fallen below the speed of said driven reference gear.

* * * * *

UNITED STATES PATENT AND TRADEMARK OFFICE
CERTIFICATE OF CORRECTION

PATENT NO. : 4,704,921

DATED : November 10, 1987

INVENTOR(S) : Timothy S. Fry

It is certified that error appears in the above-identified patent and that said Letters Patent is hereby corrected as shown below:

Col. 3, line 34, delete "gear" and insert --wheel--.

Col. 5, line 26 after "output", insert --coupling--.

Col. 5, line 34 after "coupling", insert --12--.

Col. 7, line 42, delete "driven" and insert --drive--.

Signed and Sealed this

Twelfth Day of April, 1988

Attest:

DONALD J. QUIGG

*Attesting Officer*  *Commissioner of Patents and Trademarks*